UNITED STATES PATENT OFFICE 2,437,905

CYANOALKYL ETHERS OF POLYHYDRIC ALCOHOLS

Herman A. Bruson, Rydal, Pa., assignor to The Resinous Products & Chemical Company, Philadelphia, Pa., a corporation of Delaware No Drawing. Original application January 15, 1941, Serial No. 374,603. Divided and this application December 29, 1945, Serial No. 638,451

3 Claims. (Cl. 260—464)

This invention relates to a method for preparing β-cyanoalkyl ethers of polyhydric alcohols, having two to six hydroxyl groups per molecule, of the aliphatic, arylaliphatic, and cycloaliphatic series and to the new cyanoalkyl ethers obtained thereby.

According to this invention, an alcohol having two to six (inclusive) hydroxyl groups per molecule, selected from a member of the aliphatic, arylaliphatic, or cycloaliphatic series, the chain of which may be interrupted by oxygen or sulfur, is reacted in the presence of an alkaline condensing agent or catalyst with at least one molecular equivalent of an α,β-unsaturated open chain nitrile to form a β-cyanoalkyl ether of the polyhydric alcohol. Depending upon the quantity of the unsaturated nitrile used, one or more β-cyanolalkyl groups may be introduced. The unsaturated nitriles which can be used are acrylonitrile and α-methyl-acrylonitrile compounds having the formula $$CH_2=C(R)CN$$

wherein R is hydrogen or a methyl group.

The condensation takes place readily at temperatures between about 0° C. and about 70° C. Since the reaction is exothermal, cooling at the start is often advantageous in order to prevent undesired polymerization. The quantity of alkaline catalyst used is small, an amount corresponding to 0.5 to 2% on the weight of the polyhydric alcohol being sufficient. Sodium methylate has been found to be very effective for the purpose, although sodium or potassium ethylate or metallic sodium or sodium oxide dissolved in the polyhydric alcohol itself can be used as the catalyst. There may also be used sodium hydroxide, potassium hydroxide, lime, barium hydroxide, quaternary ammonium hydroxides such as trimethyl benzyl ammonium hydroxide, etc., alkali metal amides, or the like. The reaction may be carried out in the presence of an inert solvent or suspending agent, particularly in those cases where one of the components is a solid or is difficultly soluble in the other reactant. For this purpose dioxane, benzene, toluene, dimethoxy tetraethylene glycol, water, etc., are useful.

Typical polyhydric alcohols of the aliphatic, arylaliphatic, or cycloaliphatic series which may be used are as follows:

Ethylene glycol, or its homologues, including propylene, trimethylene, tetramethylene, pentamethylene, hexamethylene, octamethylene or decamethylene glycols, 2,3-butylene glycol, 1,3-butylene glycol, octadecane-diol, divinyl glycol, dipropenyl glycol, glycerol, glyceryl-α-phenyl ether, glyceryl-α-methyl ether, trimethylol propane - 1,1,1, butantriol - 1,2,3, pentaglycerol, erythritol, pentaerythrite, mannitol, sorbital, inositol, anhydroenneaheptite, diethylene glycol, dipropylene glycol, triethylene glycol, thiodiethylene glycol, thiotetraethylene glycol $$(HOC_2H_4OC_2H_4SC_2H_4OC_2H_4OH)$$

cyclohexanediols, 1,2-dihydroxyethyl benzene, bis(β-hydroxyethoxy)-benzene, xylylene glycol, tetraethylene glycol, hexaethylene glycol, nonaethylene glycol, and the higher polyethylene glycols having molecular weights up to 4000.

One or more of the hydroxyl groups of the above compounds can be etherified by a β-cyanoalkyl group to form usually well-defined compounds useful in the plastic arts. These are also useful as intermediates in the preparation of polycarboxylic acids, esters, salts, amides, etc., which in turn are useful in diverse fields, including resins, pharmaceuticals, and insecticides. The following are examples illustrating this invention.

Example 1

$$NCCH_2CH_2-O-CH_2CH_2-O-CH_2CH_2CN$$

To 124 grams of anhydrous ethylene glycol, 4 grams of powdered sodium methylate was added. The mixture was stirred and warmed to 60°–70° C. for about five minutes until a clear solution was obtained. The solution was cooled to 15° C. and stirred while 212 grams of acrylonitrile was added dropwise so that the temperature did not exceed 25° C. This required two and one-half hours. The mixture was then stirred at 25°–28° C. for six hours to complete the reaction. It was mixed with 200 cc. of water, neutralized with dilute hydrochloric acid, and extracted with 250 cc. of ethylene dichloride. The extract was distilled to recover the solvent, and the residual oil was fractionally distilled in vacuo. The main fraction distilled under 2 mm. pressure at 156°–166° C. (mostly 158° C./2 mm.) as a colorless oil with a yield of 280 grams and corresponded to bis(2-cyanoethoxy)ethane, a compound readily soluble in water or in benzene.

Example 2

$$NCCH_2CH_2-O-CH_2CH(CH_3)-O-CH_2CH_2CN$$

To a solution of 10 grams of sodium methylate in 380 grams of propylene glycol cooled to 20° C. there was added dropwise, while the mixture was stirred and maintained at 25°–28° C. by cooling, 530 grams of acrylonitrile during a two-hour period. After the addition, the mixture was stirred for six more hours at room temperature. It was mixed then with 750 cc. of water, neutralized with hydrochloric acid, and extracted with toluene. The toluene extract was distilled to recover the solvent, leaving a residual oil which was fractionated in vacuo. The desired bis(β-cyanoethoxy)-propane-1,2 distilled between 160°–170° C./1–2 mm. (mostly at 165°–168° C./2 mm.) as a colorless oil. The yield was 710 grams.

*Example 3*

(a) 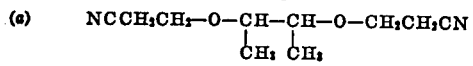

To a solution of one gram of sodium methylate in 54 grams of 2,3-butylene glycol cooled to 10° C., there was added dropwise 63.6 grams of acrylonitrile while the mixture was stirred and maintained at a temperature between 10°–20° C. The mixture was then stirred for six hours longer at 20°–25° C. and poured into 150 cc. of saturated sodium chloride solution. The oil which separated was distilled in vacuo. The desired bis(β-cyanoethoxy)-butane-2,3 distilled over at 165°–175° C./2 mm. (mostly 170° C./2 mm.) as a colorless oil which slowly solidified to a waxy crystalline mass with a yield of 79 grams. Upon recrystallization from alcohol-petroleum ether (1:1) mixture, the compound separated in stout prisms melting at 53°–54° C.

(b) 

To a solution of one gram of sodium methylate in 54 grams of 1,3-butylene glycol, there was added dropwise at 25°–40° C. 63.6 grams of acrylonitrile during one hour and the mixture stirred for seven hours at 25° C. There was then added 25 cc. of water and sufficient dilute hydrochloric acid to neutralize the alkalinity. The product was then extracted with 100 cc. of ethylene dichloride and the extract distilled in vacuo. The bis(β-cyanoethoxy)-butane-1,3 distilled at 170°–175° C./1 mm. as a colorless oil with a yield of 80 grams.

*Example 4*

NCCH₂CH₂—O—CH₂CH₂CH₂—O—CH₂CH₂CN

To a solution of two grams of sodium methylate in 76 grams of trimethylene glycol cooled to 20° C., there was added dropwise 106 grams of acrylonitrile while the mixture was stirred. During this time the temperature was held between 20° and 42° C. The mixture was then stirred for six and one-half hours at 25° C., poured into 100 cc. of water, neutralized with hydrochloric acid, and extracted with 150 cc. of ethylene dichloride. When the extract was distilled in vacuo, 159 grams of bis(β-cyanoethoxy)-propane-1,3 was obtained as a colorless liquid boiling at 165°–170° C./1–2 mm., moderately soluble in cold water and readily soluble in benzene.

*Example 5*

To a solution of one gram of sodium methylate in 46.5 grams of pentamethylene glycol, there was added dropwise 47 grams of acrylonitrile while the mixture was stirred. The temperature was held between 18° and 38° C. during the addition, which required one hour. The mixture was then stirred for six hours at 25° C., poured into 100 cc. of water, and neutralized with hydrochloric acid. The oil layer was taken up in 100 cc. of ethylene dichloride and this extract distilled in vacuo. The desired bis(β-cyanoethoxy)-pentane-1,5 distilled at 180°–190° C./1–2 mm. as a pale yellow oil with a yield of 74 grams.

*Example 6*

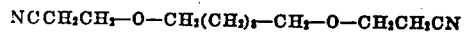

Fifty-two grams of decamethylene glycol, 50 cc. of dioxane, and 0.5 gram of sodium methylate were mixed and the mixture warmed to 60°–70° C. to give a clear solution which was cooled to 20° C., whereupon it became pasty. To this paste there was added dropwise during forty minutes 31.8 grams of acrylonitrile with good stirring while the temperature was maintained between 20° and 25° C. The mixture was then stirred for six hours at 25°–30° C., during which time the paste disappeared. The reaction product was poured into 150 cc. of water and an oil layer separated, was washed with water, and then distilled in vacuo. The product, corresponding in composition to bis(β-cyanoethoxy)-decane-1,10 distilled at 220°–230° C./1–2 mm. as a colorless oil.

*Example 7*

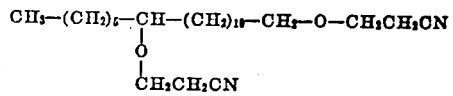

To a solution of 57.2 grams of 1,12-dihydroxyoctadecane in 75 cc. of dioxane, 0.5 gram of powdered sodium methylate was added and the mixture heated to 70° C. until clear. The mixture was cooled to 45° C. and 21.2 grams of acrylonitrile added dropwise during twenty minutes while the mixture was stirred and kept at a temperature of 45°–50° C. The mixture was then stirred at 40°–45° C. for five and one-half hours, cooled, neutralized with dilute hydrochloric acid, filtered, and dried at 100° C. under reduced pressure. The residue was dissolved in ethylene dichloride, washed with water, and the ethylene dichloride layer evaporated to dryness at 100° C. under reduced pressure. The residual oil, weighing 69 grams, solidified to a hard, white, waxy solid, corresponding by nitrogen analysis to the above formula.

*Example 8*

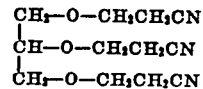

Two grams of sodium methylate was dissolved in 92 grams of pure glycerol at 60°–70 C. The solution was cooled to 25° C. and stirred while 159 grams of acrylonitrile was added dropwise thereto during the course of two and one-half hours while the temperature was maintained at 25°–30° C. by external cooling. The mixture was stirred thereafter for six hours at 25° C., then mixed with 100 cc. of water, neutralized with hydrochloric acid and extracted with 110 cc. of ethylene dichloride. The extract was distilled under reduced pressure after the solvent was removed. The desired tris(β-cyanoethoxy)-propane-1,2,3 distilled over at 250°–260° C. under 1–2 mm. pressure as a pale yellow oil with a yield of 186 grams.

*Example 9*

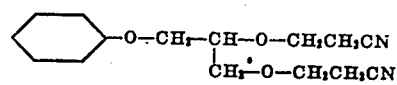

To a solution of 84 grams of glyceryl-α-phenyl ether in 100 cc. of dioxane, one gram of powdered sodium methylate was added and the mixture stirred and heated to 70° C. until clear. It was then cooled to 19° C. and 53 grams of acrylonitrile added dropwise during forty minutes while the mixture was stirred and maintained at a temperature between 20° and 25° C. It was then stirred for seven hours more at 25°–50° C., neutralized with dilute hydrochloric acid, filtered, and the filtrate evaporated under reduced pressure on a steam bath. The residual oil was washed with water and distilled in vacuo. The desired product came over between 235° and 250° C. at 1 mm. as a colorless oil in a yield of 80 grams.

*Example 10*

(a)  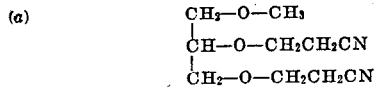

To a solution of two grams of sodium methylate in 106 grams of glyceryl-α-methyl ether, there was added dropwise with stirring and cooling to 25°–30° C. 106 grams of acrylonitrile during the course of one hour. The mixture was then stirred for six and one-half hours at 25°–30° C. to complete the reaction. The product was mixed with 25 cc. of water, neutralized with 10% hydrochloric acid, and extracted with 100 cc. of ethylene dichloride. Upon distillation of the extract in vacuo, there was obtained 131 grams of 2,3-bis-(β-cyanoethoxy)-1-methoxypropane as a colorless liquid boiling between 190° and 198° C. at 1–2 mm.

(b) In the same manner, a solution of one gram of sodium methylate in 74 grams of glyceryl-α-n-butyl ether was reacted with 53 grams of acrylonitrile to yield 55 grams of 2,3-di(β-cyanoethoxy)-1-n-butoxy-propane:

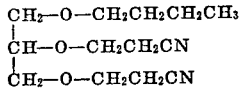

a colorless liquid boiling at 200° C./1 mm.

*Example 11*

NCCH$_2$CH$_2$—O—CH$_2$CH$_2$—O—
           CH$_2$CH$_2$—O—CH$_2$CH$_2$CN

To a mixture of 53 grams of diethylene glycol and two grams of aqueous 50% sodium hydroxide solution cooled to 20° C., there was added dropwise, with stirring and cooling to 10°–20° C., 53 grams of acrylonitrile. The mixture was stirred for five hours at a temperature between 10° and 20° C., then made slightly acid to brom thymol blue indicator with dilute hydrochloric acid. The solution was then evaporated on a steam bath in vacuo to remove water, filtered from salt, and the clear, colorless filtrate was distilled in high vacuo. The desired bis(β-cyanoethoxy)-diethyl ether boiled at 185°–195° C./1–2 mm. as a colorless oil. It is very soluble in water. The yield was 97 grams, which corresponds to a 91% yield.

*Example 12*

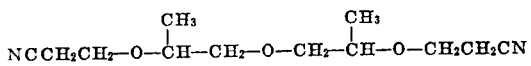

To a solution of two grams of sodium methylate in 134 grams of dipropylene glycol, there was added 106 grams of acrylonitrile dropwise during one hour while the solution was stirred and cooled. The temperature during the addition was between 25° and 45° C. The mixture was then stirred at 25° C. for seventeen hours, poured into 100 cc. of water, neutralized with dilute hydrochloric acid, and extracted with 100 cc. of ethylene dichloride. Upon distilling the extract in vacuo, the desired bis(β-cyanoethoxy)-2-2′-dipropyl ether distilled over at 185°–195° C. /1–2 mm. as a colorless, water-soluble liquid with a yield of 175 grams.

*Example 13*

(a) NC—CH$_2$CH$_2$—O—CH$_2$CH$_2$—O—
      CH$_2$CH$_2$—O—CH$_2$CH$_2$—O—CH$_2$CH$_2$CN

To a solution of two grams of sodium methylate in 150 grams of triethylene glycol, there was added dropwise, with stirring, 106 grams of acrylonitrile. The temperature was held between 20° and 30° C. during the addition, which required one and one-half hours. The mixture was then stirred for sixteen hours at 25° C., diluted with 50 cc. of water, and neutralized with hydrochloric acid. The product was extracted by shaking with ethylene dichloride and the extract distilled under reduced pressure. The desired bis(β-cyanoethoxyethyl) ether of ethylene glycol distilled over at 210°–220° C./1–2 mm. as a pale yellow, water-soluble liquid in a yield of 198 grams.

(b) By using 194 grams of tetraethylene glycol in place of the triethylene glycol in the above procedure, there was obtained the bis(β-cyanoethyl) ether of tetraethylene glycol having the formula:

NCCH$_2$CH$_2$—O—CH$_2$CH$_2$—O—CH$_2$CH$_2$—
  O—CH$_2$CH$_2$—O—CH$_2$CH$_2$—O—CH$_2$CH$_2$CN

It distilled at 220°–230° C./1–2 mm. as a pale yellow oil in a yield of 184 grams.

*Example 14*

NCCH$_2$CH$_2$—O—CH$_2$CH$_2$—(O—CH$_2$CH$_2$)$_4$—
          O—CH$_2$CH$_2$—O—CH$_2$CH$_2$CN

One gram of powdered sodium methylate was dissolved at 60°–70° C. in 141 grams of hexaethylene glycol, HO—C$_2$H$_4$—(O—C$_2$H$_4$)$_4$—O—C$_2$H$_4$OH. The solution was cooled to 15° C. and 53 grams of acrylonitrile added dropwise thereto while the mixture was stirred and maintained at a temperature of 20°–28° C. The mixture was then stirred for seventeen hours at 25° C., mixed with 25 cc. of water, neutralized with dilute hydrochloric acid, and extracted with 100 cc. of ethylene dichloride. The extract was dried in high vacuo at 100° C., giving a residue of an amber-colored oil in a yield of 181 grams. This residue was found by nitrogen analysis to correspond to the above formula (N found, 7.10%; theory 7.22%).

*Example 15*

One-half gram of sodium methylate was dissolved at 70° C. in a solution of 200 cc. of dioxane and 115 grams of polyethylene glycol, HO—CH$_2$CH$_2$—(O—CH$_2$CH$_2$)$_x$—O—CH$_2$CH$_2$OH having a hydroxyl number of 49. This substance is sold under the trademark "Carbowax" and is a waxy solid obtained from ethylene oxide. Its average molecular weight by hydroxyl number is 2290, "x" being, therefore, 50.) The solution was cooled to 30° C. and 5.3 grams of acrylonitrile added dropwise with good stirring. The temperature during the addition remained at 30° C. The mixture was then stirred for five hours at 30° C. and at 40°–50° C. for two hours. It was then cooled, neutralized with dilute hydrochloric acid, filtered, and the filtrate evaporated in vacuo on a steam bath to remove the dioxane. There remained 124 grams of a pale oil, which was dissolved in 100 cc. of ethylene dichloride. This solution was shaken with 25 cc. of water, the ethylene dichloride layer separated therefrom and evaporated in vacuo on a steam bath. The residual product consisted of 113 grams of a pale, hard wax having on analysis 0.90% nitrogen. The product, therefore, has the average composition:

NCCH₂CH₂—O—CH₂CH₂—(O—CH₂CH₂)₅₀—
O—CH₂CH₂—O—CH₂CH₂CN

It is readily soluble in water or benzene.

*Example 16*

NCCH₂CH₂—O—CH₂CH₂—S—CH₂CH₂—O—CH₂CH₂CN

To a solution of two grams of sodium ethylate in 122 grams of thiodiethylene glycol,

HOCH₂CH₂—S—CH₂CH₂OH cooled to 20° C. there was added dropwise 106 grams of acrylonitrile while the mixture was cooled and stirred. During the addition, which required one hour, the temperature was maintained between 20° and 50° C. by external cooling. The mixture was then stirred for seven hours at 25° C., poured into 100 cc. of water, neutralized with hydrochloric acid, and taken up in 100 cc. of ethylene dichloride. The product was recovered from the ethylene dichloride layer by distillation in vacuo. The bis(β-cyanoethoxy)-diethyl sulfide distilled over at 220°–230° C./1–2 mm. as a pale yellow oil in a yield of 210.5 grams, or 92% of theory.

It is soluble in benzene, somewhat soluble in cold water, and insoluble in petroleum naphtha.

*Example 17*

To a solution of 0.6 gram of sodium methylate in 31.8 grams of diethylene glycol there was added 41 grams of methacrylonitrile. The mixture was stirred for twenty-one hours at 25°–30° C. and then was heated at 65°–70° C. for five hours. It was cooled, neutralized with hydrochloric acid, and distilled in vacuo. After a forerun of unchanged reactants had come over, the main fraction distilled over between 150° and 175° C./2 mm. On fractionation, it yielded 19 grams of colorless oil boiling at 150°–155° C./1 mm. and having the formula:

HOCH₂CH₂—O—CH₂CH₂—O—CH₂—ĊH—CN
                                                    CH₃

*Example 18*

(a) 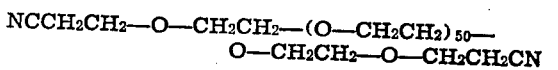

To a suspension of 40.8 grams of dry pentaerythrite (ground to pass a 100 mesh sieve) in 100 cc. of anhydrous dioxane there was added two grams of powdered sodium methylate. The mixture was stirred at 25°–30° C. for fifteen hours. Sixty-three and six-tenth grams of acrylonitrile was then added during five minutes and the mixture stirred for forty-eight hours at 25°–30° C. It was then heated at 50°–60° C. for eight hours, cooled, and filtered. The filtrate was heated in vacuo on a steam bath and evaporated to dryness. There was thus obtained 46 grams of an amber-colored syrup which was filtered to remove traces of polymer and pentaerythrite. The product contained by analysis 15.8% nitrogen, which agrees well with the value 16.09% calculated for tetra-(β-cyanoethoxymethyl)-methane. The product is readily soluble in dioxane.

(b) Acrylonitrile (63.6 grams) was added to a stirred mixture of 40.8 grams of pentaerythrite, 50 cc. of water, and two grams of sodium hydroxide at 25° C. The mixture was then warmed and stirred for seven hours at 40°–50° C. and allowed to stand for twenty-four hours at room temperature. The alkalinity was then neutralized with dilute hydrochloric acid (10% strength) and the oil layer separated. It was washed once with 300 cc. of cold water and then dried under reduced pressure at 90°–95° C. The residual product was a colorless syrup weighing 83 grams. It was very soluble in acetone, chloroform, or methanol and appreciably soluble in water. Its analysis showed it to consist to the extent of at least 95% of tetra (cyanoethoxymethyl)-methane:

C(CH₂OCH₂CH₂CN)₄

(c) In the above examples pentaerythrite has been shown as a separately prepared starting material. The reaction may be performed essentially as above, however, without separation of the pentaerythrite. This is accomplished by reacting formaldehyde, acetaldehyde, and lime in solution and, without separation of the product, adding acrylonitrile or methacrylonitrile.

*Example 19*

(a) (CH₃)₂C—CH₂—O—CH₂CH₂CN
      |
      OH

To a solution of 90 grams of isobutylene glycol and two grams of sodium methylate, there was added during one hour, dropwise, 53 grams of acrylonitrile while the mixture was stirred and maintained at a temperature between 23° and 35° C. This mixture was stirred for five and one-half hours at 25° C., then mixed with 25 cc. of water, neutralized with dilute hydrochloric acid, and extracted with 100 cc. of ethylene dichloride. The extract was distilled under reduced pressure to give a yield of 102 grams of the desired β-cyanoethoxy-tertiary butanol, distilling at 126°–130° C./10 mm. as a colorless oil. It is readily soluble in water.

(b) In the same manner, 118 grams of 2-methyl-2,4-pentanediol, two grams of sodium methylate, and 53 grams of acrylonitrile yielded 100 grams of a colorless oil boiling at 110°–120° C./1–2 mm. and having the formula:

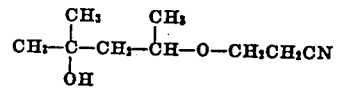

*Example 20*

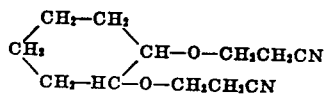

To a solution of 36 grams of 1,2-dihydroxycyclohexane in 40 cc. of dioxane, 0.5 gram of powdered sodium methylate was added and the mixture heated to 60°–70° C. until a clear solution formed. The mixture was then cooled to 35° C., and 33 grams of acrylonitrile was added dropwise during forty minutes while the mixture was stirred and maintained at a temperature between 35° and 50° C. The solution was then stirred for seven hours at 25° C., neutralized with dilute hydrochloric acid, filtered, diluted with 15 cc. of water, and shaken with 100 cc. of ethylene dichloride. The extract was distilled under reduced pressure, yielding 40 grams of a product distilling between 180° and 190° C. at 1 mm. as a colorless oil.

*Example 21*

(a) Acrylonitrile (63.6 grams) was added to a solution consisting of 36.4 grams of mannitol, 100 cc. of water, and two grams of sodium hydroxide. The mixture was stirred at 40°-50° C. for five hours, then cooled and neutralized with dilute hydrochloric acid. The clear solution was evaporated to dryness in vacuo on a steam bath at 90°-95° C., giving a residue weighing 100 grams. This was dissolved in ethylene dichloride and filtered to remove sodium chloride. The clear filtrate was then evaporated to dryness in vacuo on a steam bath to yield a product obtained as an almost colorless syrup, soluble in methanol or acetone, consisting essentially of the hexa-(cyanoethoxy)-hexane:

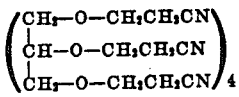

(b) Inositol in equivalent amount may be substituted for mannitol in the above example and reacted in the same manner to give a colorless syrup which consists essentially of hexa-($\beta$-cyanoethoxy)cyclohexane.

*Example 22*

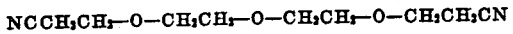

To a mixture of 53 grams of diethylene glycol and two grams of an aqueous solution containing 40% of trimethyl benzyl ammonium hydroxide cooled to 20° C., there was added dropwise, with stirring and cooling to 10°-20° C., 53 grams of acrylonitrile. The mixture was stirred for five hours at a temperature between 10 and 20° C., then made slightly acid to brom thymol blue indicator with dilute hydrochloric acid. The solution was then evaporated on a steam bath in vacuo to remove water, filtered from salt, and the clear, colorless filtrate distilled in high vacuo. The desired bis-($\beta$-cyanoethoxy)-diethyl ether boiled at 185°-195° C./1-2 mm. as a colorless oil. It is very soluble in water. The yield was 98 grams, which corresponds to a 92% yield.

The present application is a division of United States application Serial No. 374,603, filed January 15, 1941, now abandoned. The subject matter claimed in the present application is directed to compounds of the formula:

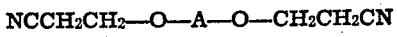

wherein A is an alkylene group having at least two carbon atoms between oxygen atoms, containing from ten to eighteen carbon atoms, inclusive. These new compounds form a class of unique plasticizers.

I claim:

1. Compounds of the formula:

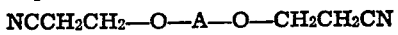

wherein A is an alkylene group having ten to twelve carbon atoms between oxygen atoms and containing from ten to eighteen carbon atoms, inclusive.

2. As a new compound, bis($\beta$-cyanoethoxy)-decane-1,10.

3. As a new compound, bis($\beta$-cyanoethoxy)-octadecane-1,12.

HERMAN A. BRUSON.

REFERENCES CITED

The following references are of record in the file of this patent:

UNITED STATES PATENTS

| Number | Name | Date |
|---|---|---|
| 2,359,708 | Bruson | Oct. 3, 1944 |
| 2,388,813 | Allen et al. | Nov. 13, 1945 |
| 2,404,164 | Carpenter | July 16, 1946 |

OTHER REFERENCES

Bruson et al., "Jour. Am. Chem. Soc.," vol. 65, pages 23-27 (1943).

Certificate of Correction

Patent No. 2,437,905. March 16, 1948.

HERMAN A. BRUSON

It is hereby certified that errors appear in the printed specification of the above numbered patent requiring correction as follows: Column 2, line 5, for the word "sorbital" read *sorbitol*; column 9, lines 24 to 28, Example 21, for the formula reading $$\begin{pmatrix} CH_2-O-CH_2CH_2CN \\ CH-O-CH_2CH_2CN \\ CH_2-O-CH_2CH_2CN \end{pmatrix}_4 \quad \text{read} \quad \begin{matrix} CH_2-O-CH_2CH_2CN \\ (CH-O-CH_2CH_2CN)_4 \\ CH_2-O-CH_2CH_2CN \end{matrix}$$

and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*